United States Patent
Orozco et al.

(10) Patent No.: US 11,471,830 B2
(45) Date of Patent: Oct. 18, 2022

(54) FILTRATION OF CHROMIUM FROM FLUE GAS IN FURNACE STACKS

(71) Applicant: ExxonMobil Chemical Patents Inc., Baytown, TX (US)

(72) Inventors: Darian E. Orozco, Austin, TX (US); William A. Aslaner, League City, TX (US); Mark A. Rooney, Pasadena, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/299,036

(22) PCT Filed: Dec. 12, 2019

(86) PCT No.: PCT/US2019/065990
§ 371 (c)(1),
(2) Date: Jun. 2, 2021

(87) PCT Pub. No.: WO2020/123811
PCT Pub. Date: Jun. 18, 2020

(65) Prior Publication Data
US 2022/0023798 A1 Jan. 27, 2022

Related U.S. Application Data

(60) Provisional application No. 62/779,634, filed on Dec. 14, 2018.

(51) Int. Cl.
*B01D 53/86* (2006.01)

(52) U.S. Cl.
CPC ...... *B01D 53/8665* (2013.01); *B01D 2255/10* (2013.01); *B01D 2255/20723* (2013.01); *B01D 2255/20738* (2013.01); *B01D 2255/20761* (2013.01); *B01D 2255/20769* (2013.01); *B01D 2255/20776* (2013.01); *B01D 2255/9202* (2013.01); *B01D 2255/9205* (2013.01); *B01D 2257/60* (2013.01); *B01D 2258/0283* (2013.01)

(58) Field of Classification Search
CPC .... F23J 3/02; F23J 15/02; F23J 15/022; F23J 2215/00; F23J 2215/60; F23J 2219/00; F23J 2219/10; F23J 2900/15021; B01D 53/86; B01D 53/64; B01D 53/8665; B01D 2257/60; B01D 2258/0283; C01B 3/32
See application file for complete search history.

(56) References Cited

U.S. PATENT DOCUMENTS

| | | | | |
|---|---|---|---|---|
| 5,619,937 | A * | 4/1997 | Linak | B01D 53/64 110/345 |
| 5,972,301 | A * | 10/1999 | Linak | C01G 37/00 588/407 |
| 7,781,361 | B2 | 8/2010 | Gadkaree et al. | |
| 8,986,639 | B2 | 3/2015 | Keusenkothen et al. | |
| 2008/0178736 | A1 | 7/2008 | Carolan et al. | |
| 2010/0050869 | A1 | 3/2010 | Gadkaree et al. | |
| 2010/0192769 | A1 | 8/2010 | Gadkaree et al. | |
| 2015/0071841 | A1 | 3/2015 | Brandmair | |
| 2016/0303508 | A1 | 10/2016 | De Vos | |

FOREIGN PATENT DOCUMENTS

| | | | |
|---|---|---|---|
| WO | 2007/133568 | 11/2007 | |
| WO | WO 2007 133 568 A2 * | 11/2007 | ............. B01D 53/86 |
| WO | 2009/123724 | 10/2009 | |

OTHER PUBLICATIONS

J. R. O'Leary et al. (Oct. 1, 2004), :"Selective Catalytic Reduction Performance in Steam-Methane Reformer Service: The Chromium Problem", Environmental Progress, vol. 23, No. 3, pp. 194-205.

* cited by examiner

*Primary Examiner* — Timothy C Vanoy
(74) *Attorney, Agent, or Firm* — ExxonMobil Chemical Patents Inc.; Siwen Chen

(57) ABSTRACT

Chromium particulate emissions in flue gas can be reduced or minimized by incorporating a thin layer bed of a catalyst within the flue gas flow path of a furnace, boiler, or other furnace environment that includes Cr-containing surfaces. The thin layer bed of catalyst can correspond to, for example, a honeycomb monolith with catalyst supported on the monolith surface, so as to provide a high contact area while forcing all of the flue gas to pass through the catalyst bed. The honeycomb monolith structure and the depth of the bed can be selected to provide a reduced or minimized pressure drop across the catalyst bed, such as a pressure drop of 0.25 kPa (1.0 inches of water) or less. Exposing the Cr-containing flue gas to the thin layer catalyst bed can result in a treated flue gas with a lower content of Cr.

29 Claims, 2 Drawing Sheets

FILTRATION OF CHROMIUM FROM FLUE GAS IN FURNACE STACKS

CROSS-REFERENCE TO RELATED APPLICATIONS

This application is a US national phase application of PCT Application Serial No. PCT/US2019/065990 having a filing date of Dec. 12, 2019, which claims priority to and the benefit of U.S. Provisional Application No. 62/779,634 having a filing date of Dec. 14, 2018, the disclosures of which is incorporated herein by reference in their entireties.

FIELD

Systems and methods are provided for filtration of chromium from flue gas generated in furnace environments that include chrome metal alloys.

BACKGROUND

Chromium (Cr) is commonly blended into steel to improve performance of the steel as a structural material. Many industrial furnaces feature Cr-containing metals in the furnace tubes to improve high temperature performance. Furnaces that use Cr metallurgy are known to emit Cr particulates to the atmosphere through the furnace flue gas.

A reaction system including a pyrolysis reactor, such as a steam cracking reactor, is an example of a reaction system that includes a high temperature furnace that can benefit from using Cr-containing types of steel for the furnace tubes. During operation, the interior surfaces of a steam cracking furnace can be exposed to two types of high temperature environments. A first type of high temperature reaction environment can correspond to the steam cracking process. A second type of high temperature reaction environment can be the decoking environment that is used to remove accumulated coke from interior furnace surfaces. Both types of high temperature environments can contribute to generation of Cr particulates in steam cracker furnace flue gas. More generally, various types of systems that include fired heaters can include both a reaction cycle and a decoking cycle.

In some reaction systems like pyrolysis reaction systems, the furnace of the reaction system can operate at a pressure that is relatively close to ambient pressure. This can allow for substantial cost savings in operation of the furnace. However, this can also mean that introduction of even a small additional pressure drop into the furnace flue gas pathway may cause disruption of the flow pattern, as the furnace stack may often operate at near the minimum pressure needed for the desired flow. If additional pressure drop is introduced into the flue gas pathway, avoiding the disruption in flow pattern can require increased power consumption be draft fans and/or reduced throughput to reduce the amount of flue gas.

What is needed are systems and methods that can remove Cr particulates from furnace flue gas while requiring a reduced or minimized amount of modification of a furnace configuration and/or while reducing or minimizing the pressure drop in the flow path for the furnace flue gas.

Many types of furnace configurations include catalyst beds for selective catalytic reduction of nitrogen oxides in furnace flue gas. In order to perform the selective catalytic reduction, a catalyst bed of sufficient size is placed in the flue gas flow path at a location where the temperature will be roughly 575° F. to 750° F. (roughly 300° C. to 400° C.). Ammonia and/or another agent to facilitate reduction of the nitrogen oxides is then injected upstream from the catalyst bed. This can provide a localized reducing environment for reduction of the nitrogen oxides in the presence of the catalyst bed. U.S. Pat. No. 8,986,639 provides an example of incorporating a selective catalytic reduction process into a pyrolysis reactor system.

An article by O'Leary et al. (Environ. Prog., 23: 194-205; 2004) describes interaction of SCR catalyst with chromium in the flue gas of a steam-methane reformer. The article discusses reduction in catalyst activity for the SCR catalyst with increasing chromium accumulation. More recently, U.S. Patent Application Publication No. 2008-0178736 discloses separating oxygen from an oxygen containing gas using an ionic transport membrane in oxidation recovery or oxidation processes. A guard bed upstream of the ionic transport membrane is used to remove chromium. The reference discloses operating the process at a temperature ≥600° C. Processes are desired in which chromium is removed at a lesser temperature in an oxygen-depleted environment, and e.g., without oxygen separation.

SUMMARY

In various aspects, systems and methods are provided for reducing the Cr content of flue gas. The flue gas can be generated from a furnace or other fired heater that includes Cr-containing metal surfaces in the environment that generates the flue gas. The Cr content of the flue gas can be reduced or minimized by removing Cr from the flue gas at a temperature in the range of from 100° C. to 590° C. The flue gas is exposed to a thin catalyst bed of transition metal somewhere within the flow path of the flue gas prior to exiting from the furnace stack. In a vertically-oriented furnace stack, the term "thin" refers to the height of the bed in the stack, not the thickness of active material on inorganic support in the bed. This can provide a variety of advantages. By using a thin catalyst bed, such as a thin bed of catalyst in the form of a honeycomb monolith, the pressure drop across the catalyst bed (e.g., across the length of the vertically-oriented monolith) can be reduced or minimized. This can have corresponding benefits of reducing or minimizing changes to the operating conditions of the furnace and/or reducing the need for additional power consumption to maintain draft in the furnace stack. Additionally, by using a separate thin catalyst bed for Cr removal, any downstream catalyst beds can be protected against possible deactivation due to the presence of the Cr in the flue gas. The process is advantageous in that it operates at a relatively low temperature and that it does not rely on catalyst bed heating by proximity to oxygen-removal membranes.

DETAILED DESCRIPTION

Figure 1:
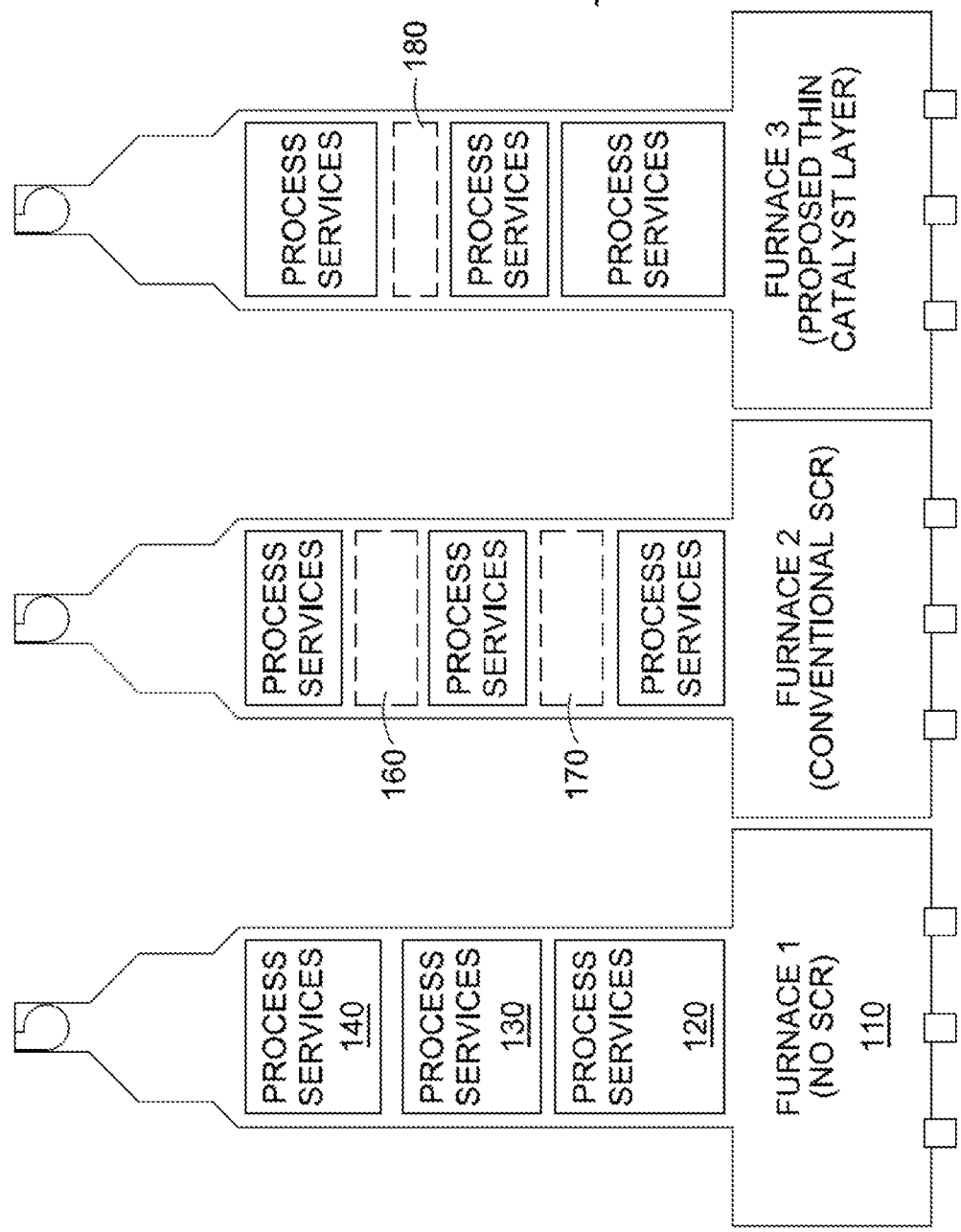
FIG. 1 schematically shows a comparison of three furnace configurations.

All numerical values within the detailed description and the claims herein are modified by "about" or "approximately" the indicated value, and take into account experimental error and variations that would be expected by a person having ordinary skill in the art.

In various aspects, chromium particulate emissions in flue gas can be reduced or minimized by incorporating a thin layer bed of a catalyst within the flue gas flow path of a furnace, boiler, or other furnace environment that includes Cr-containing surfaces. The thin layer bed of catalyst can correspond to, for example, a honeycomb monolith with catalyst supported on the monolith surface, so as to provide a high contact area while forcing all of the flue gas to pass through the catalyst bed. The honeycomb monolith structure and the depth of the bed can be selected to provide a reduced or minimized pressure drop across the catalyst bed, such as a pressure drop of 0.25 kPa (1.0 inches of water) or less. The catalyst in the catalyst bed (such as the catalyst supported on the honeycomb monolith) can correspond to one or more types of various transition metals, such as one or more metals from Group 5 (e.g., vanadium), Group 6 (e.g., molybdenum, tungsten), or Groups 8-11 (e.g., noble metals, Fe, Cu). References to Groups correspond to the group numbers from the IUPAC periodic table. Exposing the Cr-containing flue gas to the thin layer catalyst bed can result in a treated flue gas with a lower content of Cr.

In various aspects, the thin catalyst bed can be used to remove Cr from furnace flue gas while causing a reduced or minimized pressure drop. Examples of suitable bed heights for the catalyst bed (alternatively referred to as bed depths) can range from a height of 2.5 feet to 6.5 feet (~0.8 m to 2.0 m). The thin catalyst bed can correspond to any convenient type of catalyst that is suitable for performing selective catalytic reduction. For example, the catalytic metals can be supported on a honeycomb support composed of a suitable structural oxide or ceramic. A honeycomb support can be a convenient type of catalyst bed structure for various reasons, such as ease of manufacture of a desired height (or ease of combination of multiple monoliths to achieve a desired height), and ease of replacement. The honeycomb support can have a sufficient number of cells per square inch to provide a desirable surface area, such as 100 to 1000 cells per square inch, or 100 to 500 cells per square inch. The catalytic metal(s) can be deposited on the honeycomb support by any convenient method, such as by applying a washcoat. Examples of catalytic metals include, but are not limited to, Group 5 metals such as V, Group 6 metals such as Mo, W, and Group 8-11 metals such as Fe, Cu, or noble metals. It is noted that the catalytic metals can be optionally supported on a zeolite or other crystalline material having a zeolitic framework structure. In such aspects, the zeolite/zeolitic framework structure material with the supported metals can be deposited on the honeycomb support.

The thin layer catalyst bed can be added to a flue gas flow path while causing a reduced or minimized pressure drop of 0.25 kPa (~1.0 inch of water) or less, or 0.15 kPa (~0.6 inches of water) or less, or 0.10 kPa (~0.4 inches of water) or less. Limiting the pressure drop across the thin layer catalyst bed can be beneficial, as some furnace stacks operate at close to the minimum pressure for proper stack operation. Reducing the pressure of gas delivered to the furnace exhaust and/or adding a larger pressure drop within the flue gas flow path could result in reduced furnace throughput. Alternatively, in a furnace environment that can provide additional forced draft for the furnace exhaust based on a fan or blower, it can be beneficial to reduce or minimize pressure drops in order to reduce the load (and corresponding power consumption) of the fan or blower.

The location of the thin layer catalyst bed can be any convenient location where the thin catalyst bed can span the full area of the flue gas flow path (i.e., define a portion of the flue gas flow path) while providing the reduced or minimized pressure drop. This is due in part to the ability of the thin catalyst bed to be effective for Cr removal at a wide variety of temperatures. For example, the thin catalyst bed can be effective for removal of Cr at a variety of temperatures, such as a temperature in the range of from 100° C. to 590° C. For example, the thin catalyst bed can remove Cr from the flue gas at a flue gas temperature in a range of about 100° C. to 500° C., or 100° C. to 280° C., or 100° C. to 250° C., or 420° C. to 500° C., or 450° C. to 500° C. In some aspects, such as aspects where a SCR catalyst bed or another type of catalyst bed is already present in the flue gas flow path, the location of the thin catalyst bed can be selected so that the thin catalyst bed is upstream from the other catalyst bed(s). This can allow the thin catalyst bed to protect the catalytic activity of the other catalyst bed(s).

It has been discovered that a thin layer catalyst bed can be suitable for removal of Cr from flue gas without addition of external reagents to the flue gas. This is in contrast to some other types of flue gas conditioning that involve catalyst beds, such as selective catalytic reduction (SCR). For selective catalytic reduction in the presence of a SCR catalyst bed, an additional reducing agent needs to be introduced into the flue gas stream upstream from the SCR catalyst bed for the catalyst to perform the desired conversion of nitrogen oxides to nitrogen. The introduction of a separate reagent can require substantial amounts of additional equipment, thus increasing the complexity of treating a flue gas.

More generally, other types of catalytic processes for processing of a flue gas can differ from removal of Cr using a thin layer catalyst bed in one or more ways. In some aspects, the thin layer catalyst bed described herein can be thinner than other types of catalyst beds, in order to limit the pressure drop across the bed to a desirable level. For example, a conventional SCR catalyst bed can based on honeycomb monoliths can have a depth of roughly 15 feet to 20 feet (roughly 4.5 meters to 7.0 meters) in order to provide sufficient catalyst bed depth to allow for substantially complete conversion of nitrogen oxides to $N_2$. Due in part to the larger catalyst bed size, this means that a conventional SCR catalyst bed can have a pressure drop across the bed of 0.5 kPa or more.

Another difference in the placement of the thin layer catalyst bed can be based on temperature. Because the thin layer catalyst bed can perform Cr removal at a variety of temperatures, the thin layer catalyst bed can be placed at various locations within the flue gas flow path. By contrast, proper operation of a SCR catalyst bed typically involves placing the catalyst bed at a location where the temperature is between roughly 300° C. and 400° C. (~575° F.-~700° F.).

Use of a thin layer catalyst bed for reducing or minimizing the Cr content of a flue gas can also be beneficial for reducing or minimizing the amount of additional equipment that is required. For example, an alternative conventional method for reducing the Cr content of a flue gas is to incorporate an electrostatic precipitator into the flue gas flow path and/or the furnace exhaust. Incorporating an electrostatic precipitator can require a substantial amount of cost and additional equipment in comparison with incorporating a catalyst bed into a flue gas flow path.

In this discussion, a furnace environment is defined as a furnace, boiler, or other vessel that includes a combustion zone for combustion of fuel to generate heat and flue gas. The furnace environment can further include a flue gas path. The flue gas path corresponds to a volume within the furnace environment that flue gas is required to pass through in order to reach the exhaust stack for the furnace environment. Portions of the flue gas path can be defined by one or more process elements. A thin layer catalyst bed for removal of Cr-containing metal from the flue gas is an example of a process element that can define a portion of the flue gas path. Other process elements that can define a portion of a flue gas path can include heat exchangers and/or heat recovery systems, such as a heat recovery steam generator.

In some aspects, the source of Cr particles within a flue gas can correspond to one or more Cr-containing surfaces within a furnace environment. Such surfaces can correspond to surfaces composed of a Cr-containing metal and/or metal oxide. The surfaces can correspond to surfaces of a furnace or boiler and/or surfaces of one or more process elements within the furnace environment.

It is noted that in some aspects, the Cr-containing flue gas can be generated from within a process element in the furnace environment. For example, in a steam cracking system or other pyrolysis system, coke can accumulate on interior surfaces of the furnace tubes comparing Cr. During coke removal, this coke on interior surfaces of the pyrolysis furnace tubes can be exposed to steam and/or an oxygen-containing vapor such as air. Doing so chemically converts some of the accumulated coke, and a decoke effluent comprising steam (and/or air), coke conversion products, and coke particles is conducted out of the furnace tubes. The decoke effluent can be conducted into the steam cracking furnace, e.g., for additional conversion and destruction of at least a portion of the coke particles in the decoke effluent. The decoke effluent can be conducted into various locations in the furnace, e.g., into the firebox, the flue gas flow path, etc. Thus, a Cr-containing metal/metal oxide from the interior of a pyrolysis furnace tube can potentially be a source of Cr-containing flue gas.

APPLICATION EXAMPLES—STEAM CRACKING

Steam cracking is an example of a pyrolysis process that can be performed in reactors/furnaces that have Cr-containing metals in the structural components. This can result in Cr particles being present in the flue gas from a steam cracking furnace. In a steam cracking process with a hydrocarbon feed, the hydrocarbon feed is preheated, mixed with dilution steam, and then further preheated to a temperature at which significant thermal cracking is about to commence. The temperature for pre-heating and the temperature for significant thermal cracking can vary depending on the nature of the feed, with higher temperatures generally being used for feeds with lower average molecular weight. For a feed substantially composed of ethane, the temperature at which thermal cracking is about to commence may be in the range 1250° F.-1350° F. (~675° C.-~730° C.), while the temperature for substantial cracking can be 1550° F.-1650° F. (~845° C.-~900° C.). For an ethane steam cracker, a feed including 50 vol % or more ethane can be used, or 70 vol % or more, or 90 vol % or more, such as up to having a feed substantially composed of ethane (i.e., more than 99 vol % ethane and up to 100%).

The preheated feed and dilution steam can be passed to the radiant coil of a reactor where thermal cracking occurs to produce olefins. The radiant or cracking zone of a steam cracking furnace can be operated at a coil outlet pressure of ~150 kPa-g or less, with a residence time of the feed in the radiant or cracking zone of roughly 0.05 seconds to 0.25 seconds.

Immediately following the radiant zone the mixture is rapidly cooled to quench the thermal cracking reactions. Modern cracking furnace designs recover as much useful energy as possible from the cracked furnace effluent. For example, a typical ethane cracking furnace heat recovery train may include heat exchangers to generate super-high-pressure (SHP) steam, such as steam at 1500 psig (~10.3 MPa-g) or higher, followed by additional heat exchanger(s) to produce steam and/or to preheat high pressure boiler feed water (HPBFW), or furnace feed, or mixtures of furnace feed and dilution steam. The heat recovery train may also include heat exchangers to generate dilution steam from boiler feed water or treated process condensate. Regardless of the heat exchanger train employed, there is a lower limit to the furnace effluent temperature than can be achieved without fouling the heat exchangers in the system. In the case of ethane cracking, furnace effluent is generally not cooled below 350° F.-400° F. (177° C.-204° C.). A thin layer catalyst bed for Cr removal can be introduced at any convenient location in this exit train that is designed for heat recovery. Optionally but preferably, the thin layer catalyst bed can be located downstream of any components that include Cr-containing materials in exposed surfaces.

The energy input to the furnace is provided by combusting a fuel stream in burners mounted in the radiant section. The hot flue gas generated by the burners is conducted away from the firebox through the convection section and discharged to atmosphere via a flue gas stack. Hydrocarbon feeds can generally include one or more of ethane, propane, butane, naphtha, heavy gas oils, and crude oil.

FIG. 1 illustrates examples of three prophetic examples of pyrolysis furnace configurations. In FIG. 1, the internal elements of the pyrolysis system (such as furnace tubes, heat exchangers, and other structures in the furnace gas flow path) are represented as "process elements". In this example, the process elements in each pyrolysis furnace configuration are the same, except for the explicitly noted differences. In this example, the structural materials of the interior furnace walls and/or the process elements include Cr-containing materials. The furnace examples in FIG. 1 are each operated to produce a final flue gas at atmospheric pressure (~0 kPa), ~300° F. (~150° C.), and 3 vol % $O_2$ content.

The left furnace shown in FIG. 1 includes burner area 110 and process elements 120, 130, and 140. Flue gas generated in burner area 110 can rise past process elements 120, 130, and 140 to exit via furnace stack 150. As shown for the left hand furnace in FIG. 1, the total pressure drop across process elements 120, 130, and 140 is roughly 2 inches of water (0.5 kPa).

For the left furnace in FIG. 1, operating the furnace results in a flue gas that includes Cr particles. The amount of Cr particles corresponds to 7 μg per dry standard cubic meter (7 μg/dscm).

The middle furnace in FIG. 1 includes an SCR catalyst bed 160 for reduction of nitrogen oxides in the flue gas. The middle furnace also includes an ammonia injection grid 170 to provide a reducing agent for the SCR process. It is noted that a conventional SCR catalyst bed 160 provides a pressure drop of 35 kPa-125 kPa by itself, in addition to any pressure drop due to the remaining process elements.

The catalyst for a conventional SCR catalyst bed can be effective for removal of Cr particles from flue gas. Thus, even though the exit pressure, temperature, and $O_2$ content are the same, for the middle furnace example the Cr particle content is reduced to 3 μg/dscm.

The right furnace in FIG. 1 does not include an SCR catalyst bed or an injection grid. Instead, the right furnace in FIG. 1 includes a thin layer catalyst bed 180, as described herein. In this example, the thin layer catalyst bed 180 is positioned at a location to be at roughly a similar temperature to the temperature for SCR catalyst bed 160 for the middle furnace. Although the catalyst bed in the right furnace results in a pressure drop of less than 25 kPa, a similar Cr particle content of 3 µg/dscm is achieved in the flue gas.

Figure 2:
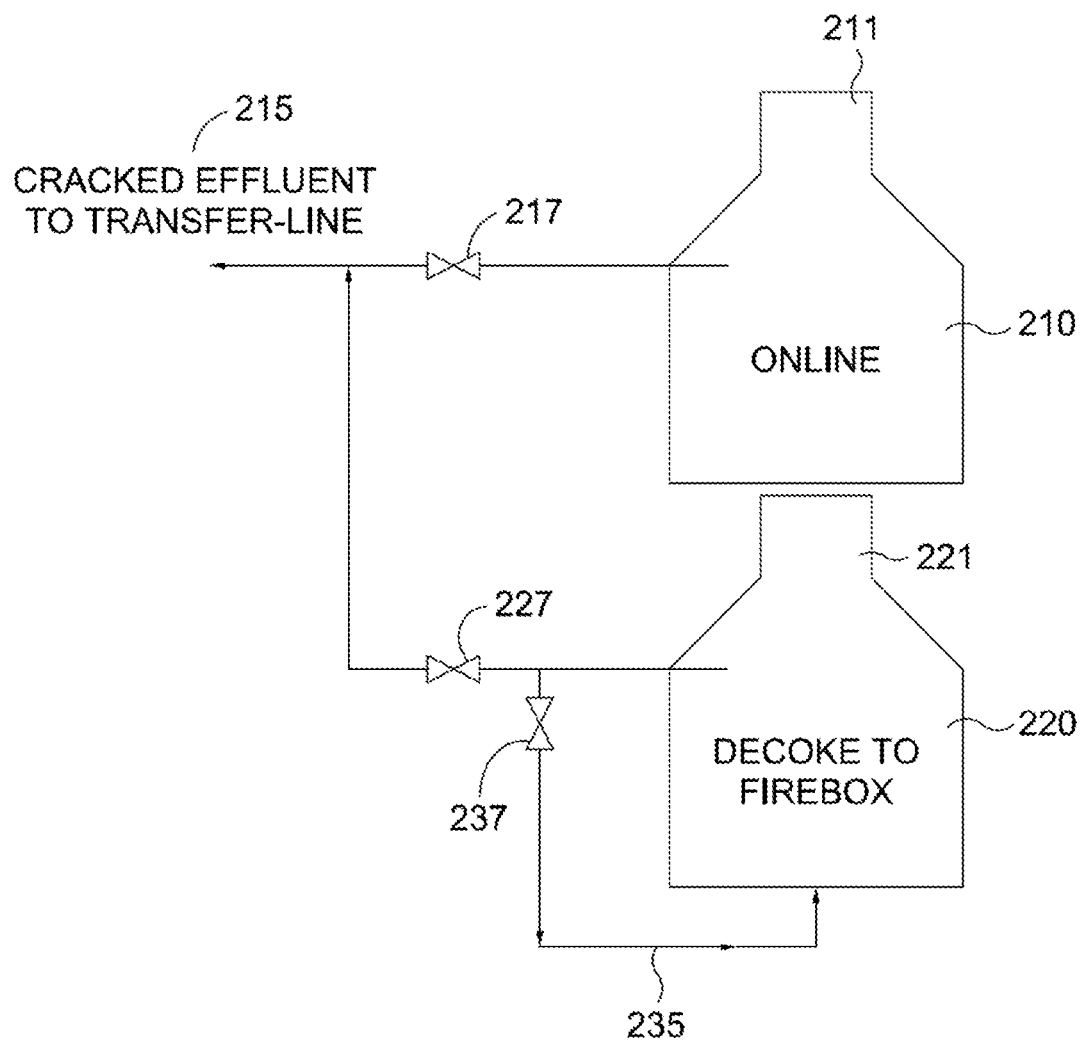
FIG. 2 shows an example of a furnace configuration for decoking to the firebox.

As another example, FIG. 2 shows a furnace configuration where coke removal is performed by decoking to the firebox, which is a process that can also result in Cr being present in a flue gas from a furnace. In FIG. 2, a configuration is shown that includes two different fired heaters corresponding to fired heater 210 and fired heater 220. In this type of configuration, one heater can perform the desired process (such as pyrolysis) while the other heater can be in a regeneration mode or otherwise offline. Of course, any convenient number of heaters could be included in this type of arrangement, to allow for rotation between heaters that are online and heaters that are in a regeneration mode and/or offline.

In FIG. 2, fired heater 210 is operating to perform a desired process, such as a pyrolysis or cracking process. For the cracking process, reactor tubes (not shown) inside of fired heater 210 can generate a thermally cracked product 215. This cracked product exits via the line that includes valve 217. In FIG. 2, valve 217 is open to allow the cracked effluent from fired heater 210 to be passed 215 into the next processing element. The flue gas from fired heater 210 exits via furnace stack 211.

In the example shown in FIG. 2, fired heater 220 is in a regeneration mode, where coke is being removed from the interior of the reactor tubes. Because coke is being removed from the interior of the reactor tubes, the gas phase products or effluent generated by decoking exits via the line that includes valve 227. However, valve 227 is closed during this process, so that the decoking effluent is routed through open valve 237 and returned back to main portion of fired heater 220. The decoking effluent can then exit from fired heater 220 via furnace stack 221. Because the decoking effluent is returned to the firebox, any Cr particles generated on the inside of the reactor tubes during decoking can also end up being passed into the furnace stack. The amount of Cr in such a decoker effluent can be reduced by using a thin layer catalyst bed, as described herein.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for reducing the Cr content of a flue gas, comprising:
combusting a fuel in a furnace environment to form a flue gas;
exposing at least a portion of the flue gas to one or more surfaces comprising a Cr-containing metal to form a Cr-containing flue gas; and
exposing the Cr-containing flue gas to a catalyst bed comprising a Group 5 metal, a Group 6 metal, a Group 8-11 metal, or a combination thereof to form a treated flue gas, wherein the catalyst bed comprises a bed height of 0.8 m to 2.0 m, and wherein the flue gas is at a temperature in the range of from 100° C. to 590° C. during exposure to the catalyst bed.

2. The method of claim 1, wherein the Cr-containing flue gas comprises 5.0 µg/dscm or more of Cr and the treated flue gas comprises 4.0 µg/dscm or less.

3. The method of claim 1, wherein the catalyst bed comprises a honeycomb monolith.

4. The method of claim 3, wherein the honeycomb monolith comprises a cell density of 100 to 1000 cells per square inch.

5. The method of claim 1, wherein the Cr-containing flue gas is exposed to the catalyst bed at a temperature of 420° C. to 500° C.

6. The method of claim 1, wherein the Cr-containing flue gas is exposed to the catalyst bed at a temperature of 280° C. or less.

7. The method of claim 1, wherein a pressure drop across the catalyst bed is 0.25 kPa or less (or 0.15 kPa or less, or 0.10 kPa or less).

8. The method of claim 1, wherein the method further comprises exposing the treated flue gas to a selective catalytic reduction catalyst bed in the presence of a reducing agent to form a reduced, treated flue gas.

9. The method of claim 1, wherein the furnace comprises a pyrolysis furnace.

10. The method of claim 1, wherein the furnace comprises an ethane steam cracking furnace.

11. The method of claim 1, wherein the one or more surfaces comprise pyrolysis furnace tubes, pyrolysis furnace side walls, or a combination thereof.

12. The method of claim 1, wherein oxygen is not removed from the flue gas after exposing the Cr-containing flue gas to the catalyst bed.

13. The method of claim 1, the method further comprising discharging the treated flue gas from a furnace stack, wherein the catalyst bed is located upstream from the furnace stack.

14. The method of claim 1, further comprising passing at least one of the flue gas, the Cr-containing flue gas, and the treated flue gas through one or more heat exchangers, one or more heat recovery systems, or a combination thereof.

15. The method of claim 1, wherein the Cr-containing flue gas is exposed to the catalyst bed without introducing a separate reducing agent into the Cr-containing flue gas.

16. The method of claim 1, wherein an ammonia content in the Cr-containing flue gas is 10 wppm or less.

17. The method of claim 1, wherein the Group 5 metal, a Group 6 metal, a Group 8-11 metal, or a combination thereof comprises vanadium, molybdenum, tungsten, a Group 8-10 noble metal, or a combination thereof.

18. The method of claim 1, wherein the Group 5 metal, a Group 6 metal, a Group 8-11 metal, or a combination thereof comprises Fe, Cu, or a combination thereof, the catalyst bed further comprising a crystalline material having a zeolitic framework structure.

19. A system for treating a flue gas, comprising:
a furnace environment comprising a fuel inlet, a combustion zone, a flue gas flow path, and a flue gas outlet; and a catalyst bed that defines at least a portion of the flue gas flow path, the catalyst bed comprising a Group 5 metal, a Group 6 metal, a Group 8-11 metal, or a combination thereof to form a treated flue gas, the catalyst bed comprising a bed height of 0.8 m to 2.0 m, wherein the furnace environment comprises one or more surfaces comprising a Cr-containing metal.

20. The system of claim 19, further comprising one or more process elements that define one or more additional portions of the flue gas flow path.

21. The system of claim 20, wherein the one or more surfaces comprising a Cr-containing metal comprise at least one surface of the one or more process elements.

22. The system of claim 20, wherein the process elements comprise pyrolysis furnace tubes.

23. The system of claim 20, wherein the one or more process elements comprise one or more heat exchangers, one or more heat recovery systems, or a combination thereof.

24. The system of claim 19, wherein the Group 5 metal, a Group 6 metal, a Group 8-11 metal, or a combination thereof comprises Fe, Cu, or a combination thereof, the catalyst bed further comprising a crystalline material having a zeolitic framework structure.

25. The system of claim 19, wherein the flue gas outlet comprises a furnace stack.

26. The system of claim 19, wherein the furnace stack is not configured to remove oxygen at any location downstream of the catalyst bed and upstream of the furnace outlet.

27. A steam cracker furnace decoking process, comprising:

contacting accumulated coke in at least one furnace tube of a steam cracker furnace with steam and/or air at a temperature in a range of from 600° C. to 900° C. to produce a decoke effluent, conducting at least a portion of the decoke effluent into the steam cracker furnace, and at least partially-converting the decoke effluent in the steam cracker furnace to produce a flue gas;

exposing at least a portion of the flue gas to one or more surfaces comprising a Cr-containing metal to form a Cr-containing flue gas;

exposing the Cr-containing flue gas to a catalyst bed comprising a Group 5 metal, a Group 6 metal, a Group 8-11 metal, or a combination thereof to form a treated flue gas, wherein the catalyst bed comprises a bed height of 0.8 m to 2.0 m, and wherein the flue gas is at a temperature in the range of from 100° C. to 590° C. during exposure to the catalyst bed; and conducting a treated flue gas away from the catalyst bed and away from an outlet of the steam cracker furnace.

28. The process of claim 27, wherein the flue gas is at a temperature in a range of from 177° C. to 204° C. during exposure to the catalyst bed.

29. The process of claim 27, wherein oxygen is not removed from the treated flue gas upstream of the steam cracker furnace outlet.

\* \* \* \* \*